(12) United States Patent
Weinmann et al.

(10) Patent No.: US 8,116,922 B2
(45) Date of Patent: Feb. 14, 2012

(54) METHOD FOR RESOLVING GROUND LEVEL ERRORS IN SIMULATIONS

(75) Inventors: Robert Vincent Weinmann, Wahpeton, ND (US); Tyler Chris Ohlsen, West Fargo, ND (US)

(73) Assignee: Appareo Systems, LLC, Fargo, ND (US)

( * ) Notice: Subject to any disclaimer, the term of this patent is extended or adjusted under 35 U.S.C. 154(b) by 865 days.

(21) Appl. No.: 11/903,386

(22) Filed: Sep. 21, 2007

(65) Prior Publication Data

US 2008/0234936 A1   Sep. 25, 2008

Related U.S. Application Data

(60) Provisional application No. 60/826,893, filed on Sep. 25, 2006.

(51) Int. Cl.
*G05D 1/08* (2006.01)
*G01C 21/00* (2006.01)

(52) U.S. Cl. ............................................. 701/4; 701/217

(58) Field of Classification Search ........................ 701/4
See application file for complete search history.

(56) References Cited

U.S. PATENT DOCUMENTS

| | | | |
|---|---|---|---|
| 4,226,491 A | 10/1980 | Kazama | |
| 4,442,491 A * | 4/1984 | Olhausen, Jr. | ................ 701/221 |
| 4,470,116 A | 9/1984 | Ratchford | |
| 4,644,494 A | 2/1987 | Muller | |
| 4,694,119 A | 9/1987 | Groenewegen | |
| 4,944,401 A | 7/1990 | Groenewegen | |
| 5,123,538 A | 6/1992 | Groenewegen | |
| 5,438,162 A | 8/1995 | Thompson et al. | |
| 5,750,925 A | 5/1998 | Purdom | |
| 5,756,934 A | 5/1998 | Purdom | |
| 6,148,179 A | 11/2000 | Wright et al. | |
| 6,160,998 A | 12/2000 | Wright et al. | |
| 6,163,681 A | 12/2000 | Wright et al. | |
| 6,167,238 A | 12/2000 | Wright | |
| 6,167,239 A | 12/2000 | Wright et al. | |
| 6,173,159 B1 | 1/2001 | Wright et al. | |
| 6,353,734 B1 | 3/2002 | Wright et al. | |

(Continued)

FOREIGN PATENT DOCUMENTS

CA   2305633   10/2001

(Continued)

OTHER PUBLICATIONS

"International Search Report", PCT/CA03/01730, (Aug. 4, 2004).

*Primary Examiner* — Tuan C. To
*Assistant Examiner* — Imran Mustafa
(74) *Attorney, Agent, or Firm* — Law Office of Mark Brown, LLC; Mark E. Brown; Jonathan L. Tolstedt

(57) ABSTRACT

A method for reconciling ground-level discrepancies between the displayed path of a moving body and a terrain model in a graphical simulation, including the steps of (1) examining the individual data points describing a recorded trip by a vehicle, (2) determining which of the data points correspond to points when the vehicle was actually on the ground, (3) determining the altitude difference between the recorded altitude data and the terrain model at each of the determined "on-ground" points, and (4) using the altitude difference to create a correction signal which can be applied either to the recorded altitude data or the terrain model.

4 Claims, 8 Drawing Sheets

U.S. PATENT DOCUMENTS

| | | |
|---|---|---|
| 6,397,128 B1 | 5/2002 | Todd |
| D470,450 S | 2/2003 | Olzak |
| 6,721,640 B2 | 4/2004 | Glenn et al. |
| 6,762,942 B1 | 7/2004 | Smith |
| 6,822,161 B2 | 11/2004 | Komatsu et al. |
| 6,867,367 B2 | 3/2005 | Zimmerman |
| 6,898,492 B2 | 5/2005 | de Leon et al. |
| 7,020,708 B2 | 3/2006 | Nelson et al. |
| 7,023,695 B2 | 4/2006 | McCollum et al. |
| 7,177,939 B2 | 2/2007 | Nelson et al. |
| 7,203,630 B2 | 4/2007 | Kolb et al. |
| 7,333,343 B2 | 2/2008 | Olzak |
| 7,356,389 B2 | 4/2008 | Holst et al. |
| 7,742,080 B2 | 6/2010 | Nakajima |
| 2002/0026567 A1 | 2/2002 | Naito et al. |
| 2005/0220055 A1 | 10/2005 | Nelson et al. |
| 2005/0246353 A1 | 11/2005 | Ezer et al. |
| 2006/0057974 A1 | 3/2006 | Ziarno et al. |
| 2006/0176651 A1 | 8/2006 | Olzak |
| 2006/0271249 A1 * | 11/2006 | Testrake et al. .................. 701/3 |
| 2007/0100516 A1 | 5/2007 | Olzak |

FOREIGN PATENT DOCUMENTS

| | | |
|---|---|---|
| EP | 0445270 | 10/1992 |
| EP | 1053290 | 3/2003 |
| WO | WO-8503583 | 8/1985 |
| WO | WO-9104525 | 4/1991 |
| WO | WO-9104921 | 4/1991 |
| WO | WO-0160693 | 8/2001 |
| WO | WO2004/045106 | 5/2004 |
| WO | WO-2004045106 | 5/2004 |
| WO | WO-2007046831 | 4/2007 |

* cited by examiner

METHOD FOR RESOLVING GROUND LEVEL ERRORS IN SIMULATIONS

CROSS-REFERENCE TO RELATED PATENT APPLICATIONS

This patent application claims priority to U.S. Provisional Patent Application No. 60/826,893, entitled, "Fleet operations quality management system," and filed on Sep. 25, 2006. The entire disclosure of the above-noted patent application is incorporated by reference in its entirety herein.

FIELD OF INVENTION

This invention pertains to a method for reconciling ground level errors in a virtual recreation of a trip caused by the inherent inaccuracies of position and altitude sensing technologies.

BACKGROUND

Graphical systems which use real-world trip data (such as location data captured by a GPS sensor mounted in an aircraft) as the basis for a three-dimensional recreation of the original trip must deal with potential inaccuracies in the data, especially when depicting near-ground-level maneuvers, such as takeoff and landing. In the real world, these inaccuracies can be easily handled. For example, an altimeter in an aircraft may show an altitude of three meters above ground level when the plane is actually sitting on the runway. Because the pilot can see and feel that he or she is sitting on the ground, however, the pilot can easily reconcile the error and not be adversely affected by it. Alternately, the pilot can communicate with the control tower of the airport to get additional information (such as the current pressure altitude reading at ground level), and use that information to calibrate their altitude instrument appropriately.

Using inaccurate recorded altitude data to represent the aircraft in a virtual environment, however, would result in the aircraft being depicted offset from the ground by at least the amount of the altitude error. In fact, in a virtual recreation, multiple error sources must be resolved, including altitude source errors, terrain model errors, and model referencing errors (that is, errors introduced because the mounting location of the altitude sensor on the real aircraft is offset from the reference point used for the virtual model).

It would be possible for the graphical software system to ask the user to input information to correct inaccurate altitude information during a virtual recreation of the trip, but this is an impractical and limited approach. Depending on the accuracy and predictability of the altitude data source, a user-entered altitude "correction" may reconcile the altitude information and the terrain model in one location, but make the problem worse in a second location. The variability of some altitude sources, such as a GPS sensor, over time can be significant. It may be that a user-entered "correction" may actually reconcile the altitude at the virtual airport location when the aircraft takes off, but compound the problem when the aircraft lands at the exact same location an hour later, due to the variation in the accuracy of the GPS signal.

These types of data collection errors are relatively small and typically do not cause problems when depicting motion significantly above ground level. For example, if the simulation is showing an aircraft flying at an altitude of 5,000 meters, an altitude error of three meters is not noticeable. However, when the simulated vehicle is operating near the ground, a difference of plus or minus three meters can make the difference of rendering the vehicle above or below the terrain.

What is needed in the art, therefore, is a method for automatically reconciling differences between the altitude data and the terrain model when creating a simulation of near-ground activities.

SUMMARY

Accordingly, it is one objective of the invention to describe a method for examining the individual data points describing a recorded trip by a vehicle and determining which of the data points correspond to points when the vehicle was actually on the ground. Then, at times in the recorded data corresponding to these confirmed "on-ground" data points, the altitude difference between the recorded altitude data and the terrain model is used to generate an altitude correction signal, which can be applied to the recorded altitude data.

It is another objective of the invention to describe a method for examining the individual data points describing a recorded trip by a vehicle and determining which of the data points correspond to points when the vehicle was actually on the ground. Then, at times in the recorded data corresponding to these confirmed "on-ground" data points, the altitude difference between the recorded altitude data and the terrain model is used to modify, or morph, the terrain model to match the altitude data.

It is yet another objective of the invention to describe one implementation of an algorithm for determining which data points in a trip data set correspond to "on-ground" points, by examining factors such as ground speed, vertical speed, geographic location of the points, and the frequency of oscillations measured at the points.

Further objectives and advantages of the invention will become apparent from a consideration of the drawings and ensuing description.

In accordance with the present invention, data collected from one or more sensors on a moving vehicle is analyzed. At a minimum, this "trip data" contains three-dimensional location information, including latitude, longitude, and altitude, from which ground speed and vertical speed can be derived. Optionally, the trip data contains information from one or more inertial measurement sensors, such as an accelerometer or gyroscope. First, data points which do not correspond to a likely landing or takeoff location (such as an airport or helipad) are eliminated to limit the amount of data that needs to be processed and to reduce errors introduced by inaccuracies in virtual terrain. Terrain around potential landing and takeoff locations is inherently flat, and, due to this fact, the elevation between successive terrain points is assumed to have little error. Then, the ground speed recorded or derived for each remaining data point is examined, and those data points which are above a predefined ground speed threshold are eliminated. Next, the vertical speed recorded or derived for each remaining data point is examined, and those data points which are above a predefined vertical speed threshold are eliminated. Finally, if the data points contain inertial measurement information, the frequency of the oscillations recorded for each remaining data point is analyzed, and data points with an oscillation frequency below a predefined threshold are eliminated. The remaining data points are assumed to correspond to confirmed "on-ground" locations.

Now that it is known when the vehicle was on the ground, the difference between the recorded altitude and the height of the terrain model at these on-ground points is determined, and this difference is the basis for a correction signal. The correction signal can either be applied to the recorded altitude, if it is believed the terrain model is the more accurate source of information, or it can be applied to morph the terrain model, if it is believed the recorded altitude is the more accurate source of information.

DETAILED DESCRIPTION

Figure 1:
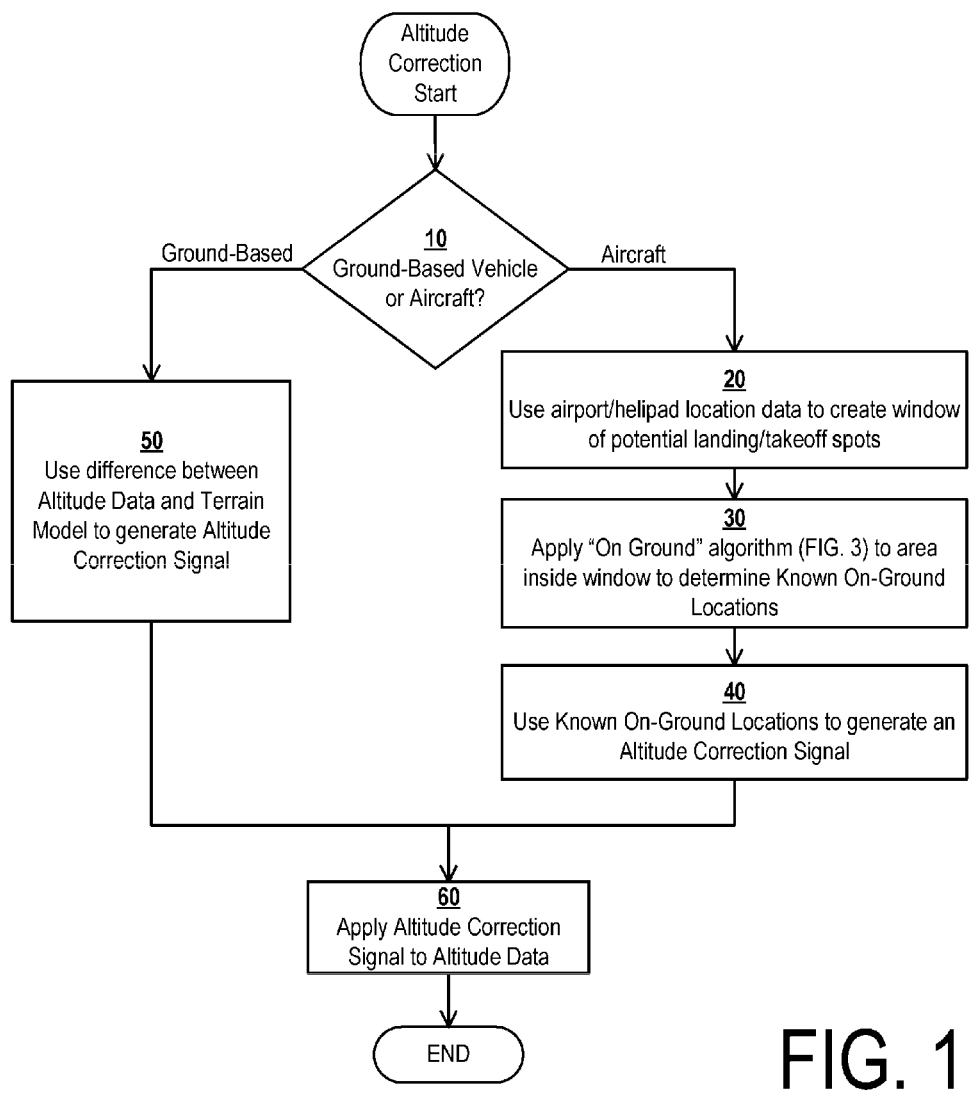
FIG. 1 is a flowchart depicting one implementation of an algorithm used to correct inaccurate altitude data in order to reconcile differences between an altitude data source and a terrain model.

FIG. 1 is a flowchart depicting one implementation of an algorithm used to correct inaccurate altitude data in order to reconcile differences between an altitude data source and a terrain model. In this "altitude correction" algorithm (referenced previously in the current specification, as well as in U.S. provisional patent application 60/826,893, which is incorporated by reference in its entirety herein, as "runway stick module" 1004), it is assumed that the terrain model being used for the simulation is appropriately accurate, and that any difference found between the location of the surface of the terrain model and the altitude reading will be caused by an inaccurate altitude source.

First, it must be determined if the algorithm is to be used in the simulation of a ground-based vehicle or an aircraft (Step 10). If the algorithm is to be used for a ground-based vehicle simulation, then it can be assumed that the vehicle will be in contact with the ground nearly 100 percent of the time. Therefore, the difference between the altitude data and the surface of the terrain model can be immediately used to generate an altitude correction signal (Step 50) for the entire recorded trip. The altitude correction signal can be applied directly to the recorded altitude data (Step 60).

An "aircraft" shall be defined here to be any appropriate fixed-wing or rotary-wing aircraft, a glider, a lighter-than-air balloon, or any other vehicle, including vehicles normally considered "ground-based", for which their use includes a substantial "off-ground" component. For example, the term "aircraft" as used herein may apply to a motorcycle or other normally ground-based vehicle which is used to perform above-ground stunts.

If it is determined during Step 10 that the vehicle being simulated is an aircraft, analysis must be performed on the recorded trip data to determine which of the data points it contains correspond to known on-ground locations. This recorded trip data, or trip file, is recorded by the data recording module 101 as described previously in the current specification, as well as in U.S. provisional patent application 60/826,893, which is incorporated by reference in its entirety herein. This analysis is done by first eliminating any data points within the trip data which are not within a predefined window of distance from a potential takeoff or landing location, such as an airport or helipad (Step 20). In one implementation, Step 20 may be performed by applying information of known controlled airspaces available from a Federal Aviation Administration (FAA) database. In another implementation, Step 20 may be performed by requiring the simulation user to enter the location of the potential takeoff or landing site by hand. In still another implementation, Step 20 may be performed by making the assumption that the beginning or end of a recorded trip is either a takeoff or a landing from an FAA location or other on-ground location.

Once the data set has been limited to only that data near known takeoff and landing locations (Step 20), an "on-ground" algorithm is applied to the remaining data points to determine a final set of "known on-ground locations" (Step 30). One implementation of Step 30 involves examining information contained in or derived from the recorded trip data to determine when a vehicle is on the ground. This implementation is detailed in FIG. 3, which will be discussed shortly. Another implementation of Step 30 involves the use of a simple sensor such as a "weight on wheels" switch, which will be mechanically activated when the wheels from the vehicle make contact with the ground. The result of Step 30 is a reduced, final set of data in which all remaining data points are assumed to correspond with known on-ground locations.

For each known on-ground location, the altitude data corresponding to that location is compared to the altitude of the surface of the terrain model. Since the terrain model is assumed to be accurate by this algorithm, any difference between the two sources of data is assumed to be caused by inaccuracies in the altitude data. The difference between the recorded altitude data and the surface of the terrain model is therefore used to generate an altitude correction signal (Step 40). The altitude correction signal can be applied directly to the recorded altitude data (Step 60).

Figure 2:
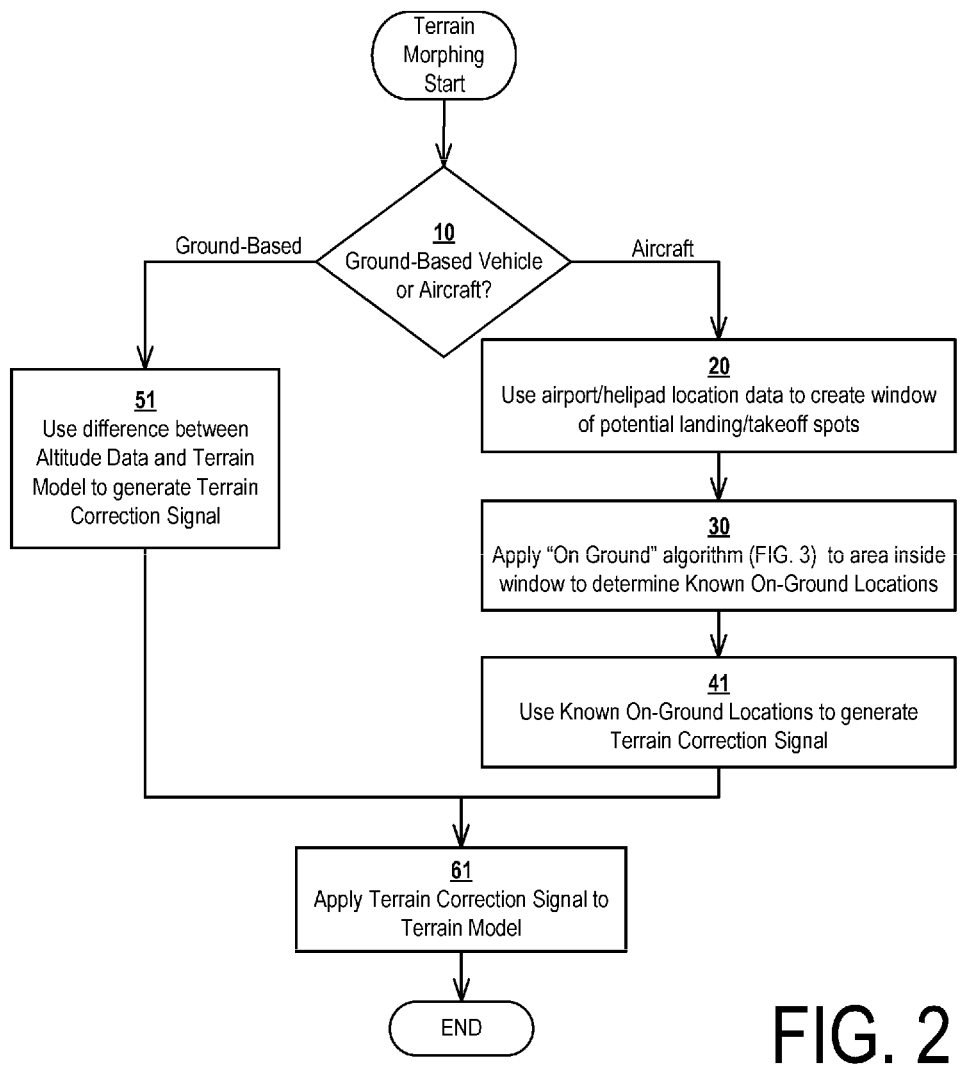
FIG. 2 is a flowchart depicting one implementation of an algorithm used to modify an inaccurate terrain model in order to reconcile differences between an altitude data source and a terrain model.

FIG. 2 is a flowchart depicting one implementation of an algorithm used to modify, or morph, an inaccurate terrain model in order to reconcile differences between an altitude data source and a terrain model. In this "terrain morphing" algorithm, it is assumed that the recorded altitude data is appropriately accurate, and that any difference found between the location of the surface of the terrain model and the altitude reading will be caused by an inaccurate terrain model.

The algorithms shown in FIG. 1 and FIG. 2 are very similar, and so the ensuing discussion will focus mostly on the steps that are different. The steps in FIG. 2 that are repeated from FIG. 1 retain the same step number; therefore the discussion of the corresponding step in FIG. 1 applies to the step in FIG. 2.

As in the algorithm of FIG. 1, the "terrain morphing" algorithm of FIG. 2 first determines if the algorithm is to be used in the simulation of a ground-based vehicle or an aircraft (Step 10). If the algorithm is to be used for a ground-based vehicle simulation, then the difference between the altitude data and the surface of the terrain model can be immediately used to generate a terrain correction signal (Step 51). This terrain correction signal can be used to morph the terrain over the entire length of the recorded trip (Step 61).

A "terrain model" shall be defined as a set of points in three-dimensional space which are used to represent the surface of the Earth in a simulation. Since at least three points in space are required to represent a planar surface in a simulation, a terrain model is often constructed of a finite set of triangles whose sides are joined together to form a triangular "mesh". A single triangle of data points in space can represent a flat surface such as a plain, but additional triangles are required to represent features on that plain. For instance, three triangles are needed, at a minimum, to represent a pyramid shape, which might represent a smooth-sided mountain on the terrain model. It is obvious to one skilled in the arts that the greater the number of data points or triangles used in the terrain model, the higher the quality of the simulation.

Therefore, the act of "morphing" a terrain model may require the addition, deletion, or movement of the data points defining that terrain model. In the present invention, the terrain morphing algorithm can be used to improve the quality of the terrain model around known on-ground locations by morphing the terrain so that it corresponds in location to the known on-ground locations.

Returning to FIG. 2, if it is determined during Step 10 that the vehicle being simulated is an aircraft, analysis must be performed on the recorded trip data to determine which of the data points it contains correspond to known on-ground locations. This analysis is done by first eliminating any data points within the trip data which are not within a predefined window of distance from a potential takeoff or landing location, such as an airport or helipad (Step 20). Once the data set has been limited to only that data near known takeoff and landing locations (Step 20), an "on-ground" algorithm is applied to the remaining data points to determine a final set of "known on-ground locations" (Step 30). The result of Step 30 is a reduced, final set of data in which all remaining data points are assumed to correspond with known on-ground locations.

For each known on-ground location, the altitude data corresponding to that location is compared to the altitude of the surface of the terrain model. Since the altitude data is assumed to be accurate by this algorithm, any difference between the two sources of data is assumed to be caused by inaccuracies in the terrain model. The difference between the recorded altitude data and the surface of the terrain model is therefore used to generate a terrain correction signal (Step 41). The terrain correction signal can be applied directly to the simulated terrain model (Step 61).

Figure 3:
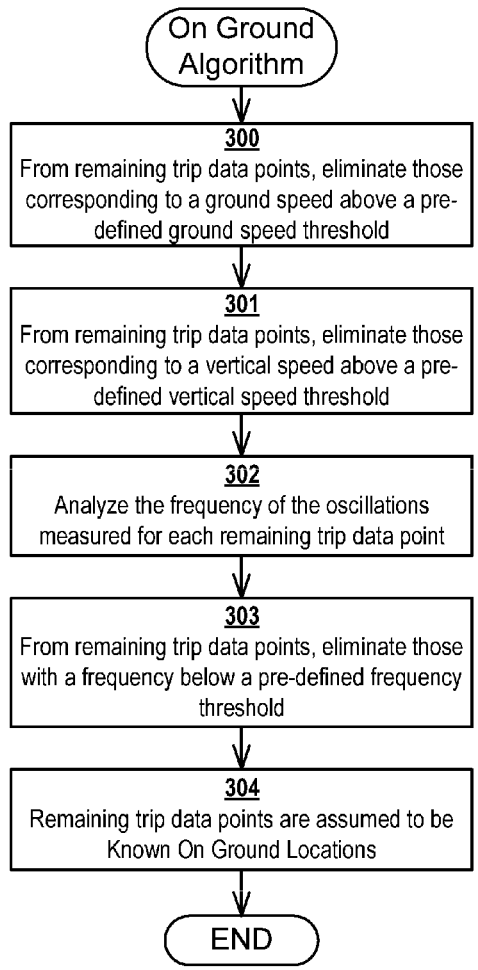
FIG. 3 is a flowchart depicting one implementation of an algorithm to determine when a vehicle or moving body is on the ground by analyzing the data points representing a trip of that vehicle or moving body.

FIG. 3 is a flowchart depicting one implementation of an algorithm to determine when a vehicle or moving body is on the ground by analyzing the data points representing a trip of that vehicle or moving body. First, the ground speed corresponding to each of the remaining trip data points is analyzed, and data points which are above a pre-defined ground speed threshold are eliminated from further consideration (Step 300). In one implementation of Step 300, the pre-defined ground speed threshold is defined as that speed below which an aircraft is incapable of flight. The ground speed analysis of Step 300 works well for fixed wing aircraft, which require air to be pushed across the surface of the wing to create lift. However, for rotary-wing aircraft, such as a helicopter which is capable of hovering over a location, the application of Step 300 may not eliminate any additional data points. Therefore, additional analyses are required.

After the application of Step 300, the vertical speed corresponding to each of the remaining data points is analyzed, and data points for which the absolute value of the vertical speed (since vertical speed can be both positive and negative) is above a pre-defined vertical speed threshold are eliminated from further consideration (Step 301). If an aircraft is resting on the ground, any differences in vertical speed detected are due to inaccuracies in the altitude data (since altitude data is used to derive the vertical speed). If the derived vertical speed is changing constantly at a rate above that which can be explained by altitude data inaccuracies, then the aircraft is assumed to be moving (either up or down) and the data points corresponding to this movement are eliminated from further consideration as on-ground locations.

Finally, after the application of Step 301, the frequency of the oscillations measured for each remaining trip data point is analyzed (Step 302). The word "oscillations" is used here to describe vibration-type movements detected by inertial measurement sensors mounted on the aircraft. These inertial measurement sensors may include accelerometers, gyroscopes, or any other appropriate inertial sensing technology. When an aircraft is suspended in air during flight, the oscillations detected by inertial measurement sensors are relatively low in frequency compared to oscillations detected when the aircraft is still operating but in contact with the ground. Therefore, when the frequency of the oscillations corresponding to the remaining data points are analyzed, those data points with a frequency that falls below a pre-defined frequency threshold are eliminated (Step 303). The points remaining after the application of Steps 300, 301, 302, and 303 are then assumed to correspond to known on-ground locations (Step 304).

Figure 4:
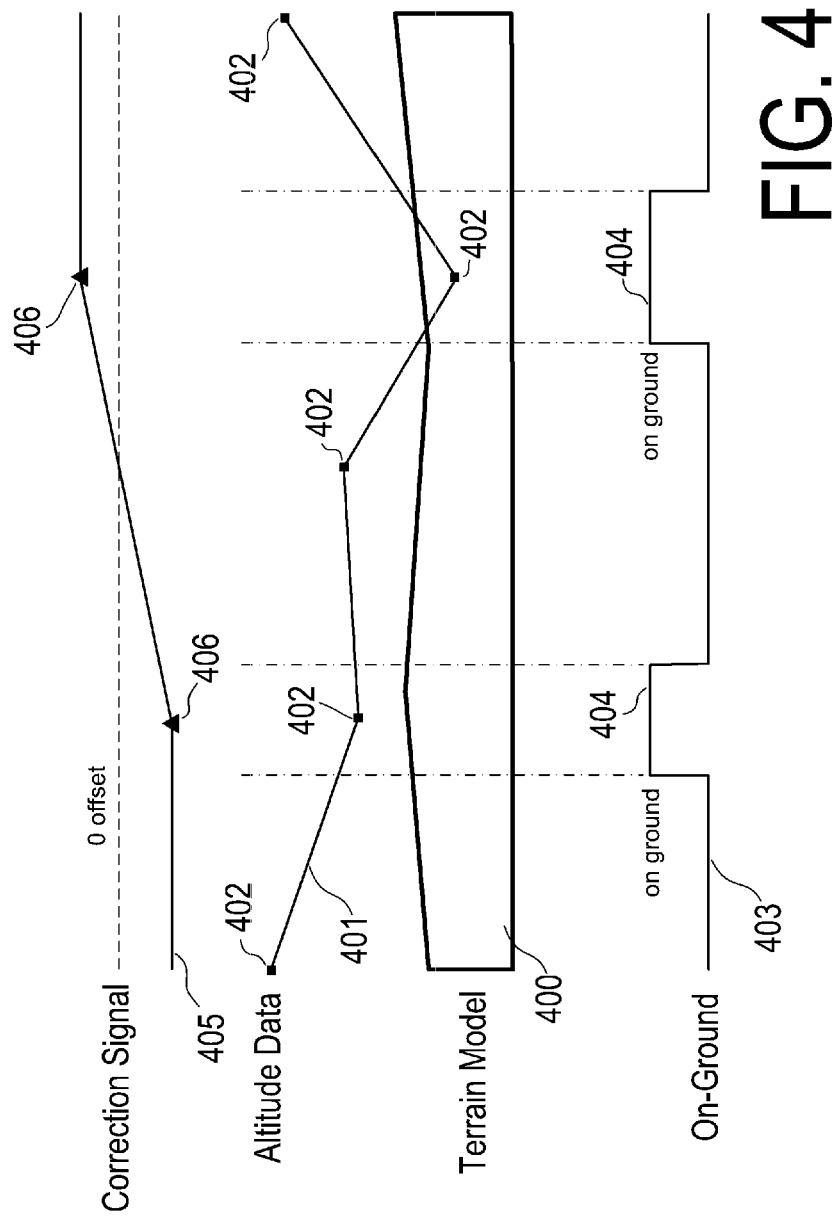
FIG. 4 is a graph illustrating how the corrections of FIG. 1 and FIG. 2 are generated.

FIG. 4 illustrates how a correction signal, such as that described in FIG. 1 or FIG. 2, is created. A terrain model 400 is rendered to represent an existing geographic location. Terrain models are created from databases comprised of data points representing actual elevations corresponding to the geographic locations being simulated. Although the individual data points given in these terrain databases are typically very accurate, the elevations between data points must be assumed. The more data points used to simulate a given piece of terrain, the more accurate the terrain model. However, a large number of data points requires a large amount of storage space. Trade-offs are made between terrain accuracy and data storage space. When fewer data points are used, the terrain model will likely have inherent inaccuracies.

The uncorrected path of an aircraft 401, comprised of a plurality of discrete altitude data points 402 corresponding to known points in time, is rendered over the terrain model 400. Because of inaccuracies in either the terrain model 400 or the altitude data points 402, some of the altitude data points 402 are rendered in the wrong location, either too far above or below the terrain model 400.

Separately, an on-ground algorithm such as that of FIG. 3 is applied to the trip data set to create an on-ground waveform 403, with known on-ground locations 404. Points of trip data corresponding to the known on-ground locations 404 are examined, and a correction signal 405 is created based on the differences in altitude between the altitude data points 402 and the surface of the terrain model 400. Discrete correction data points 406 are created for each point in the trip corresponding to a known on-ground location 404, and the rest of the correction signal 405 is created by interpolating between the correction data points 406.

Having described the preferred embodiment, it will become apparent that various modifications can be made without departing from the scope of the invention as defined in the accompanying claims. In particular, the order shown for the steps in the algorithms depicted in FIG. 1, FIG. 2, and FIG. 3 may be changed slightly without significantly changing the end result. Step 20, as shown in FIG. 1 and FIG. 2, can be eliminated, so that the successive steps are performed on the entire data set, and not just those data points corresponding to a known takeoff or landing location. As discussed in the specification, the on-ground algorithm described in FIG. 3 may be replaced with a simpler algorithm. For example, the on-ground algorithm of FIG. 3 may eliminate Steps 301 and 302, focusing only on the analysis of the measured oscillations. The use of a "weight on wheels" switch may eliminate the need for the on-ground algorithm of FIG. 3 altogether. Additionally, the algorithms described herein may be applied to any moving body depicted in a simulation or virtual recreation, including a ground-based vehicle or a human performer.

Figure 5:
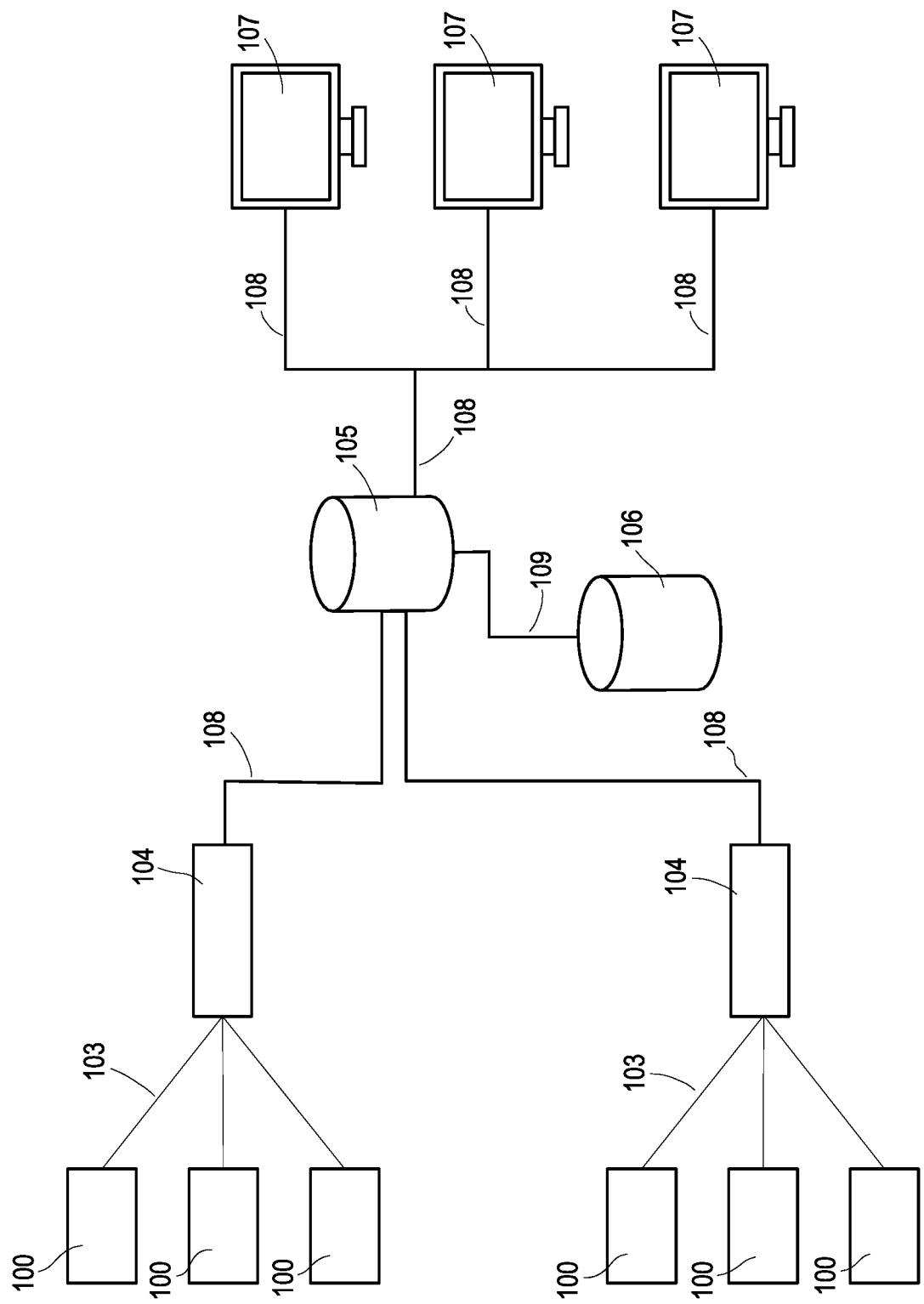
FIG. 5 is a system-level schematic of one embodiment of a fleet operations quality management system which may employ the "runway stick" altitude correction algorithms defined in FIG. 1 and FIG. 2.

FIG. 5 shows one embodiment of a fleet operations quality management system. Data is captured from multiple instances of moving bodies 100 (e.g., trucks, automobiles, aircraft (e.g., airplanes, gliders), watercraft (e.g., boats), unmanned aircraft, unmanned ground vehicles, or any other vehicle in a vehicle fleet) and transferred to one of a number of what may be characterized as one or more data processing devices, computers, or data collection kiosks 104 via an appropriate communications link 103 (e.g., a portable memory device, a wireless data connection). A single data collection kiosk 104 can serve and collect data from any appropriate number of moving bodies 100, and thereafter process this data in a manner that that will be discussed in more detail below. The fleet operations quality management system may use any appropriate number of data collection kiosks 104, and each data collection kiosk 104 may be used in relation to any appropriate number of moving bodies 100. Data captured on the moving bodies 100 is stored in the form of raw data that is, readings captured directly from sensors on the moving bodies 100 and not processed in any fashion. Once the raw data is received by a particular data collection kiosk 104 regarding a particular trip by a particular moving body 100, it is processed; that is, the raw sensor values are processed in at least some manner (e.g., calibrated, evaluated, compared, and/or combined together using algorithms on the data collection kiosk 104) to produce what may be characterized as processed navigational data or a trip file (e.g., having an enhanced accuracy). This trip file (a processed collection of raw sensor data on a trip by a vehicle) is sent in any appropriate manner to a main server 105, such as via an Internet connection 108 or via any other appropriate communications link. In one embodiment, the trip file may be queued for later transmission to the main server 105 during off-peak hours. In any case, the main server 105 evaluates the trip file and sends it for archiving in a central database 106. A remote access station 107 (e.g., a terminal, a laptop computer, a desktop computer, a "dumb terminal," or the like) may be used to view a particular trip file stored in the central database 106 and/or on the main server 105, for instance through a web application. Any appropriate number of remote access stations 107 may be operatively interconnected with the main server 105/central database 106.

A collection of moving bodies 100 (e.g., vehicles) may be characterized as a fleet (e.g., a vehicle fleet) in relation to the fleet operations quality management system of FIG. 5. A fleet may be defined by any appropriate number of moving bodies 100, any appropriate number of data collection kiosks 104 may be used by any given fleet, any appropriate number of remote access stations 107 may be used in relation to any given fleet, and any appropriate number of remote access stations 107 may be used in relation to each fleet, all in relation to the fleet operations quality management system of FIG. 5. The fleet operations quality management system of FIG. 5 may be used in relation to any appropriate number of fleets (e.g., the main server 105 may be configured to service a single fleet, or alternatively the main server 105 may be configured to service any appropriate number of multiple fleets). For instance, the fleet operations quality management system of FIG. 5 could be used in relation to a single fleet or in relation to multiple fleets.

Figure 6:
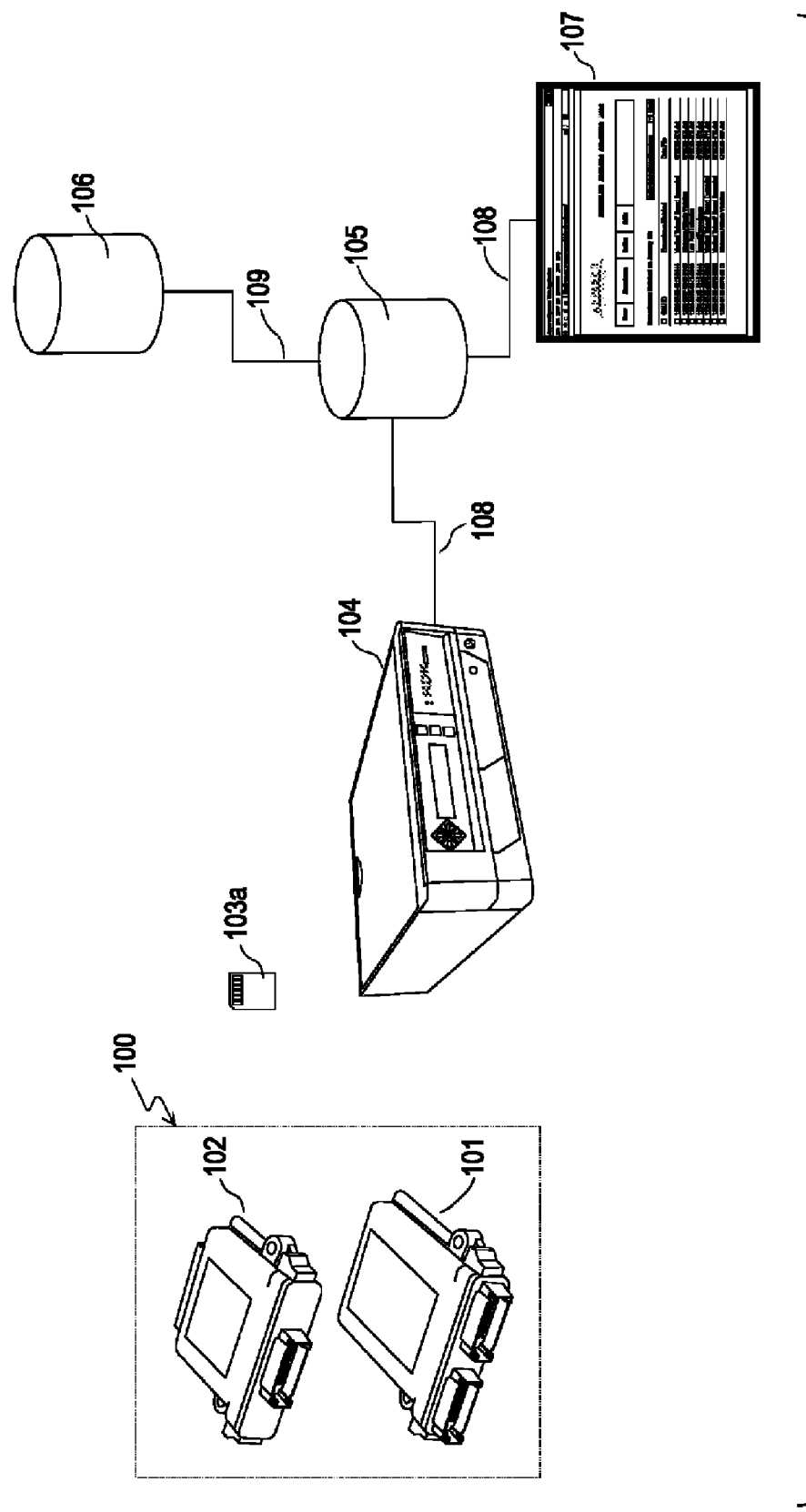
FIG. 6 is a perspective view of one embodiment of certain components that may be used by the fleet operations quality management system of FIG. 5.

FIG. 6 shows one embodiment of certain components that may be used by the fleet operations quality management system of FIG. 5, showing the flow of data from a single instance of a moving body 100 shown in FIG. 5 through the system to display on a remote access station 107. What may be characterized as a remote or mobile flight recorder, mobile data recording unit, or mobile sensor data recording unit 101 is mounted in any appropriate manner on a moving body 100 and is used to capture data about the movement and operation of the moving body 100. The data is sent from the mobile data recording unit 101 to a remote data storage system or remote memory subsystem 102 which is also mounted in any appropriate manner on the moving body 100, where this data may be stored indefinitely for later extraction. In one embodiment, each of the mobile data recording unit 101 and the remote memory subsystem 102 are detachably mounted to the moving body 100 (although again any mounting technique may be utilized), but in any case preferably each are at least substantially maintained in a stationary or fixed position relative to the moving body 100. When one or more trips have been completed by the moving body 100, the data may be transferred from the remote memory subsystem 102 to a data collection kiosk 104 in any appropriate manner (e.g. via a portable memory device 103a as shown in FIG. 6, via a wireless transmission device). The data collection kiosk 104 may be at any appropriate location, such as a central location in the form of an aircraft or truck terminal or a "home base" for a fleet of the moving objects 100. The data collection kiosk 104 may be in the form of a personal computer or the like, and is used because of the inherent processing power found in a personal computer. The data collection kiosk 104 performs the bulk of the processing of the data that has been captured and downloaded by the mobile data recording unit 101 and remote memory subsystem 102, thereby allowing the mobile data recording unit 101 and remote memory subsystem 102 to use lower-cost, low-performance processors used only for acquisition of raw sensor data. The data collection kiosk 104 processes the raw data retrieved from the remote memory subsystem 102 (preferably, on a trip-by-trip basis, such that the identify of the raw data on each trip is maintained). The data collection kiosk 104 then may queue the processed data for later transmission to a main server 105 over an Internet connection 108 as previously noted.

The main server 105 may be installed at any appropriate location, such as a central location or the like in the form of a company headquarters. The main server 105 may communicate with one or more data collection kiosks 104 associated with a single fleet operation (e.g., a single company), or may communicate with one or more data collection kiosks 104 for each of multiple fleet operations (e.g., multiple companies). The main server 105 analyzes the data received from the data collection kiosk 104 (e.g., the above-noted trip file). Data items from each recorded trip are compared against established trip profiles to determine if the moving body 100 for which the data was recorded performed outside of its acceptable performance ranges. These trip profiles consist of a set of rules against which each recorded trip or trip file is measured. If a trip file is shown to have broken one of the established rules for the corresponding trip profile, an "exceedance" is said to have occurred. Trip files which are shown to contain one or more exceedances are marked for later review by a user of the fleet operations quality management system. Trip files with one or more exceedances are sent via an Internet connection 108 for display on one or more remote access stations 107 (e.g., via a web application). All trip files with no exceedances (non-event trip files) are sent via an Internet connection 108 for archiving and further processing in a central database 106. A user of the fleet operations quality management system can download and review the trip files containing one or more exceedances using a remote access station 107 (e.g., via a web application), and can also use a remote access station 107 (e.g., via a web application) to retrieve non-event trip files from the central database 106 as well. The fleet operations quality management system could be configured so that the trip files with one or more exceedances are automatically sent to the relevant remote access station(s) 107 (e.g., via a web application), the system could be configured so that the trip files with one or more exceedances can be retrieved through the remote access station(s) 107 (e.g., via a web applications) by logging onto the main server 105, or both. Access to the trip files stored on the main server 105 and/or central database 106 may be appropriately controlled as desired/required, for instance if the fleet operations quality management system of FIG. 5 is handling multiple fleet operations (e.g., being used in relation to fleets for multiple organizations or companies).

In addition to using a remote access station 107 (e.g., via a web application) to download and review exceedances and trip files, a user of the fleet operations quality management system may use a remote access station 107 (e.g., via a web application) to define any appropriate number of trip profiles. In this regard, a remote access station 107 (e.g., via a web application) may be used to define one or more rules for a desired trip profile. These trip profiles may vary depending upon the type of moving body 100, may vary from fleet operation to fleet operation, or both (e.g., different companies may wish to employ different requirements for the same type of moving vehicle 100, even when used for the same application). Examples include a trip profile for a commercial aircraft delivering goods to an off-shore oil platform, to a land-based trip profile for a commercial delivery truck following in-town routes. A typical rule for a flight-based trip profile may include a minimum altitude that must be maintained while over populated areas, while a similar rule would be meaningless for a land-based delivery truck.

Figure 7:
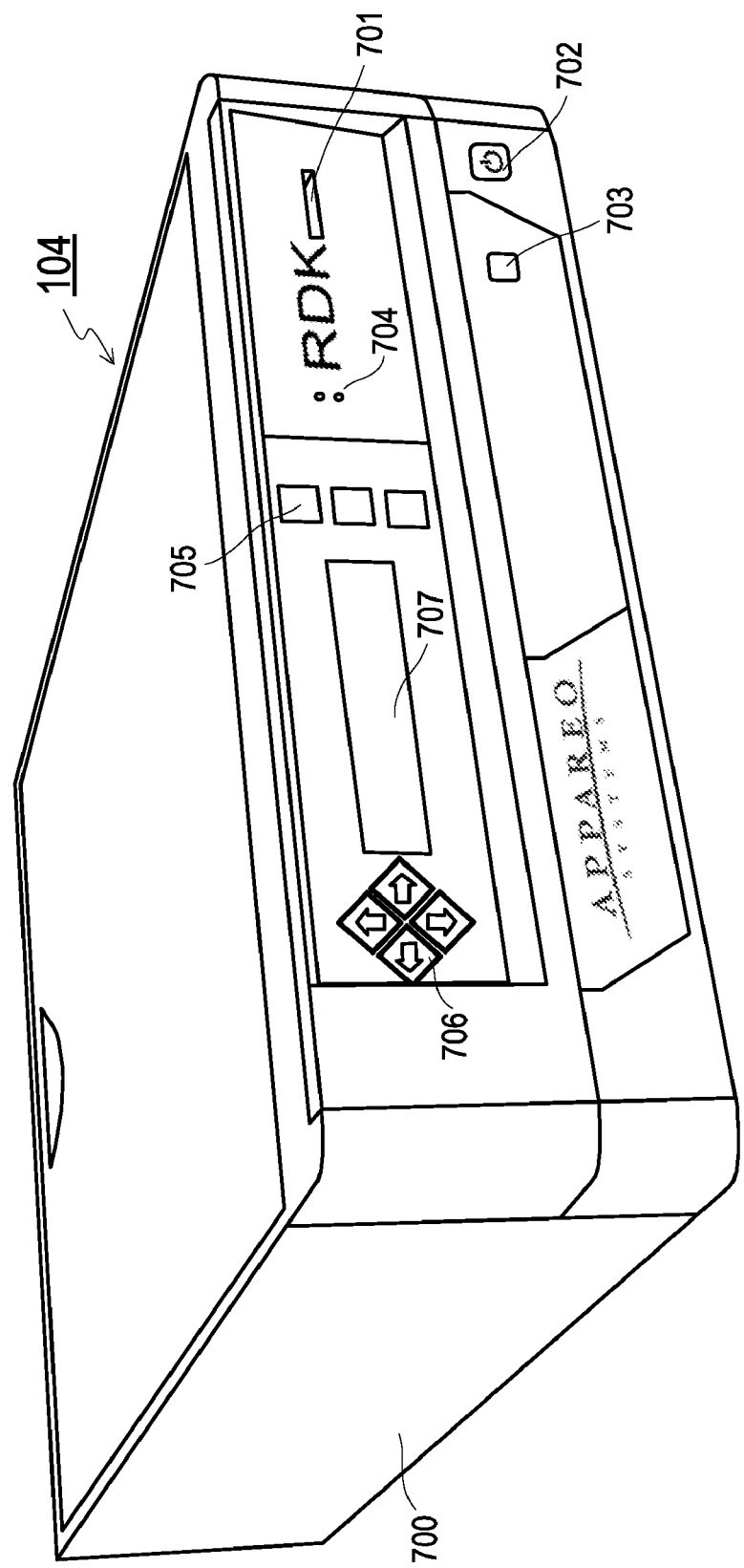
FIG. 7 is a perspective view of the off-vehicle or remote data processing device or data collection kiosk illustrated in FIG. 6.

FIG. 7 illustrates the features of one embodiment of a data collection kiosk 104. The data collection kiosk 104 is a dedicated computer for receiving and processing the data relating to the moving body 100 after the entire trip file has been defined. The data collection kiosk 104 may be placed at a central location at a fleet terminal or the like, such as a user or maintenance worker's office, or at any other appropriate location. The user transfers the data from the remote memory subsystem 102 associated with a particular moving body 100 to the data collection kiosk 104 in any appropriate manner. In one embodiment, a portable memory device 103*a* again is used for this data transfer, and the portable memory device 103*a* is placed in the kiosk memory device slot 701 of the data collection kiosk 104. Light emitting diodes (LEDs) 704 provide status indications to the user, such as when the data collection kiosk 104 is powered on and when the data is being processed. The user initiates the data extraction process by pressing the data extraction button 703, although the data extraction process could be initiated in any appropriate manner. A display panel 707 provides feedback on the extraction process to the user in the form of text and menu options. The user can interact with the menu on the display panel 707 through the use of the function keys 705 and the direction keys 706. Data is transferred and cached in the internal memory of the data collection kiosk 104. The data collection kiosk 104 then processes the cached raw sensor data using algorithms stored on the data collection kiosk 104. These algorithms may combine raw sensor readings taken from multiple sensors and combine and filter them to derive new data values which are more accurate than the values from any single sensor. This process is called "sensor fusion". Additional detail on the sensor fusion process is given in FIG. 8, which describes the sensor fusion process hosted on the data collection kiosk 104, and, in articular relevance to this application, on the "runway stick" software module 1004 which implements the algorithms of FIG. 1 and FIG. 2 of the present application. The data collection kiosk 104 can be turned on and off using the power key 702. A kiosk housing 700 encloses and protects the electronics of the data collection kiosk 104. Any appropriate housing may be used for the data collection kiosk 104.

After each trip file from the portable memory device 103*a* has been processed by the data collection kiosk 104, the portable memory device 103*a* may be erased and formatted for use with a mobile data recording unit 101, and then removed from the kiosk memory device slot 701. Data from multiple moving bodies 100 can be processed in this manner.

In one embodiment, a portable memory device (e.g., a memory card, or the portable memory device 103*a*) can be used to send information from the data collection kiosk 104 back to the remote memory subsystem 102. This information is copied onto the portable memory device by the data collection kiosk 104, and the portable memory device is then inserted back into the remote memory subsystem 102. This information can include requests to initiate built-in self tests, commands for additional data, or new operating software for the remote memory subsystem 102. Once the portable memory device containing the information or commands is placed into a memory device slot on the remote memory subsystem 102, the commands may be initiated by the user pressing an operator button on the front of the remote memory subsystem 102 or in any other appropriate manner.

When a trip file recorded from moving body 100 has been extracted and processed, the trip file may be queued for later transmission to the main server 105 over an Internet connection 108 or in any other appropriate manner. Typically, the trip file would be scheduled for transfer over the Internet connection 108 during off-peak hours, such as overnight, to avoid taking system bandwidth away from day to day operations. However, trip files may be sent at any appropriate time.

The main server 105 receives the trip file and analyzes the same. The main server 105 compares the data in each trip file against established trip profiles to see if any of the trip files contain "exceedances". An exceedance is an event when the moving body 100 performed outside of the ranges established as acceptable or safe in the pre-defined trip profiles (e.g., where a moving body 100 broke a rule associated with the trip profile). For example, if an aircraft is supposed to maintain a minimum altitude above a populated city, an exceedance occurs when the aircraft drops below that minimum altitude when above a city. Trip files that do not contain exceedances are sent for archival and further processing in a central database 106. Trips with one or more exceedances may be sent for display to an operator on a web application 107.

Figure 8:
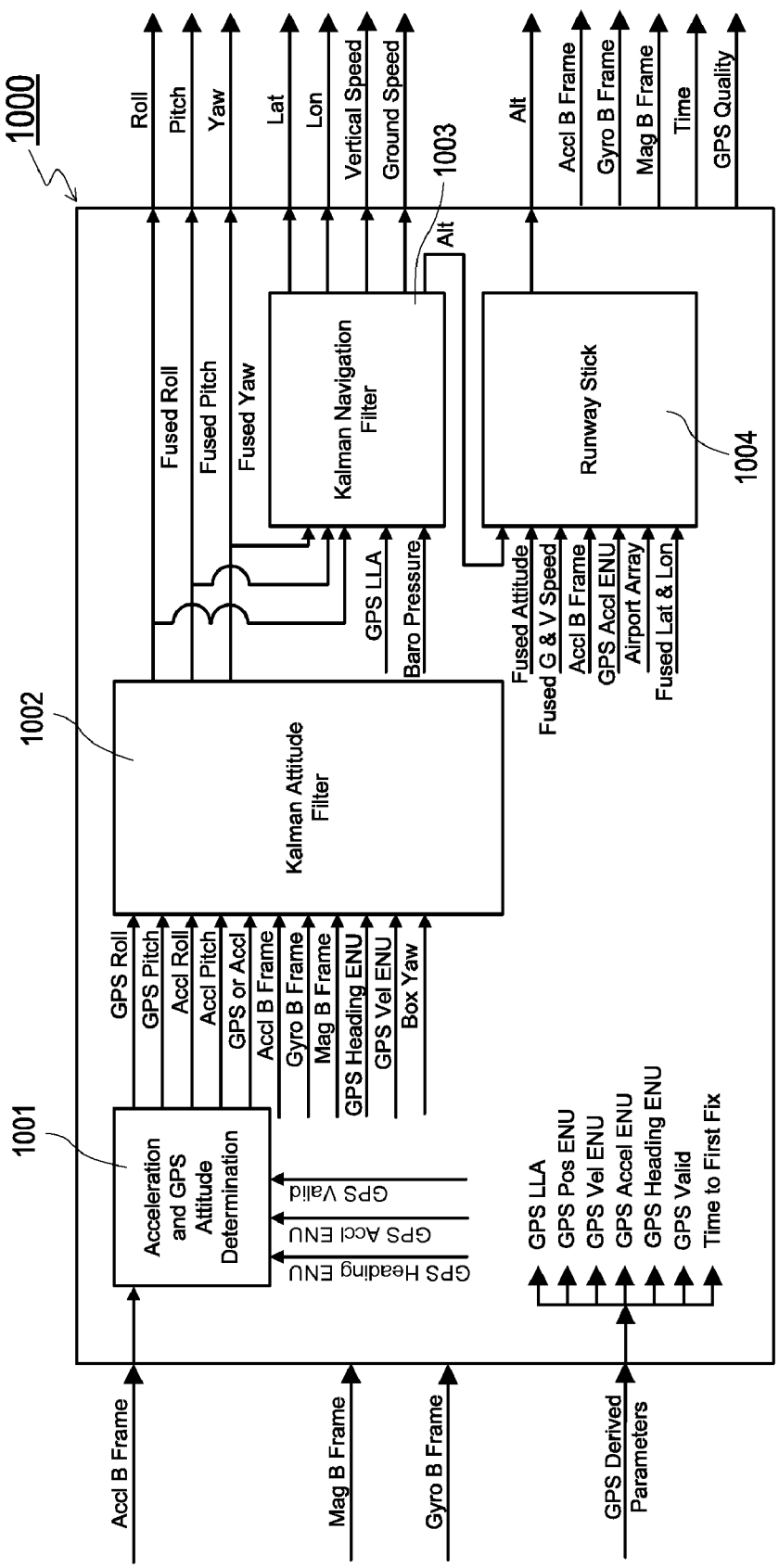
FIG. 8 is a block diagram of one embodiment of a sensor fusion software module that may be utilized by the fleet operations quality management system of FIG. 5, and which contains the "runway stick" altitude correction algorithms defined in FIG. 1 and FIG. 2.

FIG. 8 provides additional detail on the sensor fusion software 1000 that is executed on the data collection kiosk 104. Inputs to the sensor fusion module 1000 include data items captured by sensor suites in the mobile data recording unit

101. These items include the magnitude of the acceleration in each axis, the rate of rotation around each axis, the magnitude of the magnetic field in each axis, and parameters derived from the global positioning system (GPS) signals. These GPS-derived parameters include GPS LLA (latitude-longitude-altitude) values and GPS ENU (East-North-Up) values.

Two redundant forms of attitude are fed into a Kalman filter 1002 to create a more accurate attitude value. The primary form of attitude is determined using gyroscope-sensed rotational rates and standard inertial navigation attitude propagation equations. The secondary form of roll and pitch is calculated by an acceleration and GPS attitude determination module 1001 using the GPS derived parameters and values from the accelerometers in sensor suites in the data recording unit 101. The secondary form of yaw is derived from GPS heading or magnetic heading, depending on which form has been determined to be of the highest accuracy.

The complementary properties of the primary and secondary forms of attitude are exploited to create a fused form of attitude whose combined properties are greater than the sum of the individual components. The gyroscope-derived form of attitude has low measurement to measurement noise but drifts with time, rendering the solution useless on its own after a short period of time (such as 30 seconds). The secondary form of attitude has high measurement to measurement noise but does not drift with time.

Acceleration and GPS-derived acceleration can be used to estimate roll and pitch. Accelerometers measure linear acceleration and gravity. GPS-derived acceleration measures only linear acceleration. If the gravity vector can be estimated, the roll and pitch can be calculated. This requires aligning the accelerometer-sensed acceleration, which is aligned with the body frame, and GPS-derived acceleration which is referenced to the locally level frame. The X and Y measurements can be aligned by rotating the GPS derived acceleration by the heading ($\psi$) estimate calculated from GPS velocity. The alignment process is given by the following equation:

$$r_x = -(\cos(\psi) \times GPSAccel_n + \sin(\psi) \times GPSAccel_E)$$

$$r_y = -(-\sin(\psi) \times GPSAccel_n + \cos(\psi) \times GPSAccel_E)$$

$$r_z = g + GPSAccel_U$$

Once GPS acceleration has been aligned with the Accelerometer X and Y axes, roll ($\phi$) and pitch ($\theta$) can be calculated as is shown in the following equation:

$$\sigma_\theta = \frac{r_x a_x + r_z\sqrt{r_x^2 + r_z^2 - a_x^2}}{r_x^2 + r_z^2}$$

$$\theta = \tan^{-1}\left(\frac{\sigma_\theta r_x - a_x}{\sigma_\theta r_z}\right)$$

$$r_\theta = r_x \sin(\theta) + r_z \cos(\theta)$$

$$\sigma_\phi = \frac{r_y a_y + r_\theta\sqrt{r_y^2 + r_\theta^2 - a_x^2}}{r_y^2 + r_\theta^2}$$

$$\phi = \tan^{-1}\left(\frac{-\sigma_\phi r_y + a_y}{\sigma_\phi r_\theta}\right)$$

In cases where linear acceleration is known to be minimal, accelerometers can be used alone to determine roll and pitch. This is given by the following equations:

$$\theta = \tan^{-1}(a_x)$$

$$\phi = \tan^{-1}\left(\frac{a_y}{a_z}\right)$$

The Kalman Attitude Filter functional block 1002 contains a Kalman filter as well as the functional blocks responsible for attitude computation from the gyroscope rotational rate signal. The Kalman Attitude Filter functional block 1002 also contains the magnetic heading computation, logic to choose between magnetic heading and GPS heading, and logic to choose between GPS/accelerometer and accelerometer alone derived roll and pitch.

Fused roll, pitch, and yaw values exit the Kalman Attitude Filter 1002 and are stored for in the trip file for later use. In addition, these fused values are sent to a Kalman navigation filter 1003 which combines the fused attitude values with the GPS LLA values and barometric pressure readings to determine vertical speed, ground speed, and latitude and longitude positional values.

The concept of "runway stick" takes advantage of the fact that if certain conditions are met it can be determined that a vehicle is not airborne. When a vehicle is not airborne, the knowledge of the surface of the earth at that latitude and longitude can be used to correct altitude deviations caused by GPS performance limitations.

Algorithms have been developed which can detect takeoff and landing, and are implemented in the runway stick module 1004. The first step in determining takeoff and landing is to determine as many points as possible where it is known that the aircraft is on the ground. It can be determined that the aircraft is on the ground if the ground speed over an interval is below a predefined threshold. The second step in determining if an aircraft is in the air is to check if vertical speed is greater than a predefined threshold. If the application of this algorithm is limited to cases where aircraft have taken off and landed at an airport, the reliability of the algorithm can be increased. Next, a window around which takeoff has occurred is determined by finding windows of data where the aircraft has gone from being on the ground within a bounding box around the airport to points where the vertical speed is greater than a predefined threshold. Next, a window around which landings have occurred is determined in the same manner as takeoffs were determined. Now that a window has been placed around takeoffs and landings, the point of takeoff and landing can be determined. When an aircraft is on the ground, the frequency of acceleration oscillations tends to be faster than when it is airborne. The transition from high-to low-frequency behavior can be captured by taking the finite Fourier transform of many small sub-windows of the original window of data and weighting each sub window as a whole based on its frequency content. Using the weighted frequency content of the window, a transition can be detected by low-pass filtering the result and then comparing it to a predefined threshold. The crossing point is the takeoff or landing point.

What is claimed is:

1. A method performed on a computer for resolving errors in a virtual recreation of ground-level activities caused by inaccurate altitude data, comprising the steps of: acquiring using the computer a first acquiring a first set of data points representing a recorded trip of a moving body, wherein each point in said first set of data points comprises information describing an altitude of said moving body at a given point in said recorded trip, applying an on-ground algorithm to said first set of data points to produce a second set of data points, wherein said second set of data points is a subset of said first set of data points, and wherein all points in said second set of data points correspond to known points in said recorded trip when said moving body was operating on the ground, determining an altitude difference between said each point in said second set of data points and an altitude of a corresponding elevation point on the surface of a virtual terrain model, using said altitude difference to generate an altitude correction signal for said each point in said first set of data points, and applying said altitude correction signal to said altitude of said moving body contained in said each point of said first set of data points;

wherein said each point in said first set of data points further comprises oscillation frequency, wherein said oscillation frequency describes the frequency of oscillations caused by vibration movements of the moving body and recorded on said moving body at a given point in said recorded trip; and applying said on-ground algorithm step comprises: eliminating points in said first set of data points wherein said ground speed exceeds a pre-defined ground speed threshold to create a first intermediate set of data points, eliminating points in said first intermediate set of data points wherein the absolute value of said vertical speed exceeds a pre-defined vertical speed threshold to create a second intermediate set of data points, and eliminating points in said second intermediate set of data points wherein said oscillation frequency falls below a pre-defined frequency threshold to create said second set of data points.

2. The method of claim 1, wherein said moving body is selected from the group consisting of a fixed-wing aircraft, a rotary-wing aircraft, a glider, a ground vehicle and a human performer.

3. A method performed on a computer for resolving errors in a virtual recreation of ground-level activities caused by an inaccurate terrain model and creating a corrected virtual terrain model, comprising the steps of:

acquiring using the computer a first set of data points representing a recorded trip of a moving body, wherein each point in said first set of data points comprises information describing an altitude of said moving body at a given point in said recorded trip, applying an on-ground algorithm to said first set of data points to produce a second set of data points, wherein said second set of data points is a subset of said first set of data points, and wherein all points in said second set of data points correspond to known points in said recorded trip when said moving body was operating on the ground, determining an altitude difference between said each point in said second set of data points and an altitude of a corresponding elevation point on the surface of a virtual terrain model, using said altitude difference to generate a terrain correction signal for said each point in said first set of data points, and applying said terrain correction signal to said surface of said virtual terrain model, wherein said surface of said virtual terrain model is modified accordingly;

said each point in said first set of data points further comprises the ground speed and vertical speed of said moving body at a given point in said recorded trip;

wherein said each point in said first set of data points further comprises oscillation frequency, wherein said oscillation frequency describes the frequency of oscillations caused by vibration movements of the moving body and recorded on said moving body at a given point in said recorded trip; and applying said on-ground algorithm step comprises: eliminating points in said first set of data points wherein said ground speed exceeds a pre-defined ground speed threshold to create a first intermediate set of data points, eliminating points in said first intermediate set of data points wherein the absolute value of said vertical speed exceeds a pre-defined vertical speed threshold to create a second intermediate set of data points, and eliminating points in said second intermediate set of data points wherein said oscillation frequency falls below a pre-defined frequency threshold to create said second set of data points.

4. The method of claim 3, wherein said moving body is selected from the group consisting of a fixed-wing aircraft, a rotary-wing aircraft, a glider, a ground vehicle and a human performer.

* * * * *